United States Patent
Humphris et al.

(10) Patent No.: US 9,222,958 B2
(45) Date of Patent: Dec. 29, 2015

(54) BEAM SCANNING SYSTEM

(71) Applicant: INFINITESIMA LIMITED, Oxford, Oxfordshire (GB)

(72) Inventors: Andrew Humphris, Oxfordshire (GB); Bin Zhao, Oxford (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 14/375,622

(22) PCT Filed: Jan. 29, 2013

(86) PCT No.: PCT/GB2013/050195
§ 371 (c)(1),
(2) Date: Jul. 30, 2014

(87) PCT Pub. No.: WO2013/114100
PCT Pub. Date: Aug. 8, 2013

(65) Prior Publication Data
US 2015/0020244 A1  Jan. 15, 2015

(30) Foreign Application Priority Data

Jan. 31, 2012  (GB) .................................. 1201640.8

(51) Int. Cl.
*G01Q 20/02* (2010.01)
*G01Q 10/04* (2010.01)
*G01Q 10/00* (2010.01)

(52) U.S. Cl.
CPC ................ *G01Q 20/02* (2013.01); *G01Q 10/00* (2013.01); *G01Q 10/045* (2013.01)

(58) Field of Classification Search
USPC .......................... 850/1, 2, 3, 4, 5, 6, 7, 19, 20
See application file for complete search history.

(56) References Cited

U.S. PATENT DOCUMENTS

| 5,861,550 | A | 1/1999 | Ray |
| 6,032,518 | A * | 3/2000 | Prater et al. ...................... 73/105 |
| 6,330,824 | B1 | 12/2001 | Erie et al. |
| 2002/0024004 | A1* | 2/2002 | Shimada et al. ............... 250/216 |
| 2007/0195333 | A1 | 8/2007 | Negishi |
| 2009/0032706 | A1 | 2/2009 | Prater et al. |
| 2015/0013035 | A1* | 1/2015 | Humphris et al. ................. 850/1 |

FOREIGN PATENT DOCUMENTS

| EP | 1 684 414 A1 | 7/2006 |
| WO | 20090147450 A1 | 12/2009 |

OTHER PUBLICATIONS

Marti, O. et al., "Mechanical and thermal effects of laser irradiation on force microscope cantilevers," Ultramicroscopy 42-44 (1992) 345-350, North-Holland.

(Continued)

*Primary Examiner* — Nicole Ippolito
(74) *Attorney, Agent, or Firm* — Hauptman Ham, LLP

(57) ABSTRACT

Apparatus for illuminating a probe of a probe microscope. A lens is arranged to receive a beam and focus it onto the probe. A scanning system varies over time the angle of incidence at which the beam enters the lens relative to its optical axis. The scanning system is typically arranged to move the beam so as to track movement of the probe, thereby maintaining the location on the probe at which the beam is focused. The scanning system may comprise a beam steering mirror which reflects the beam towards the lens; and a mirror actuator for rotating the beam steering mirror.

18 Claims, 9 Drawing Sheets

(56) References Cited

OTHER PUBLICATIONS

Ramos, D. et al.,"Photothernnal excitation of microcantilevers in liquids," Journal of Applied Physics 99, 124904 (2006).

International Search Report mailed Mar. 27, 2013 in International Application No. PCT/GB2013/050195, filed Jan. 29, 2013.
Written Opinion mailed Mar. 27, 2013 in International Application No. PCT/GB20131050195, filed Jan. 29, 2013.

* cited by examiner

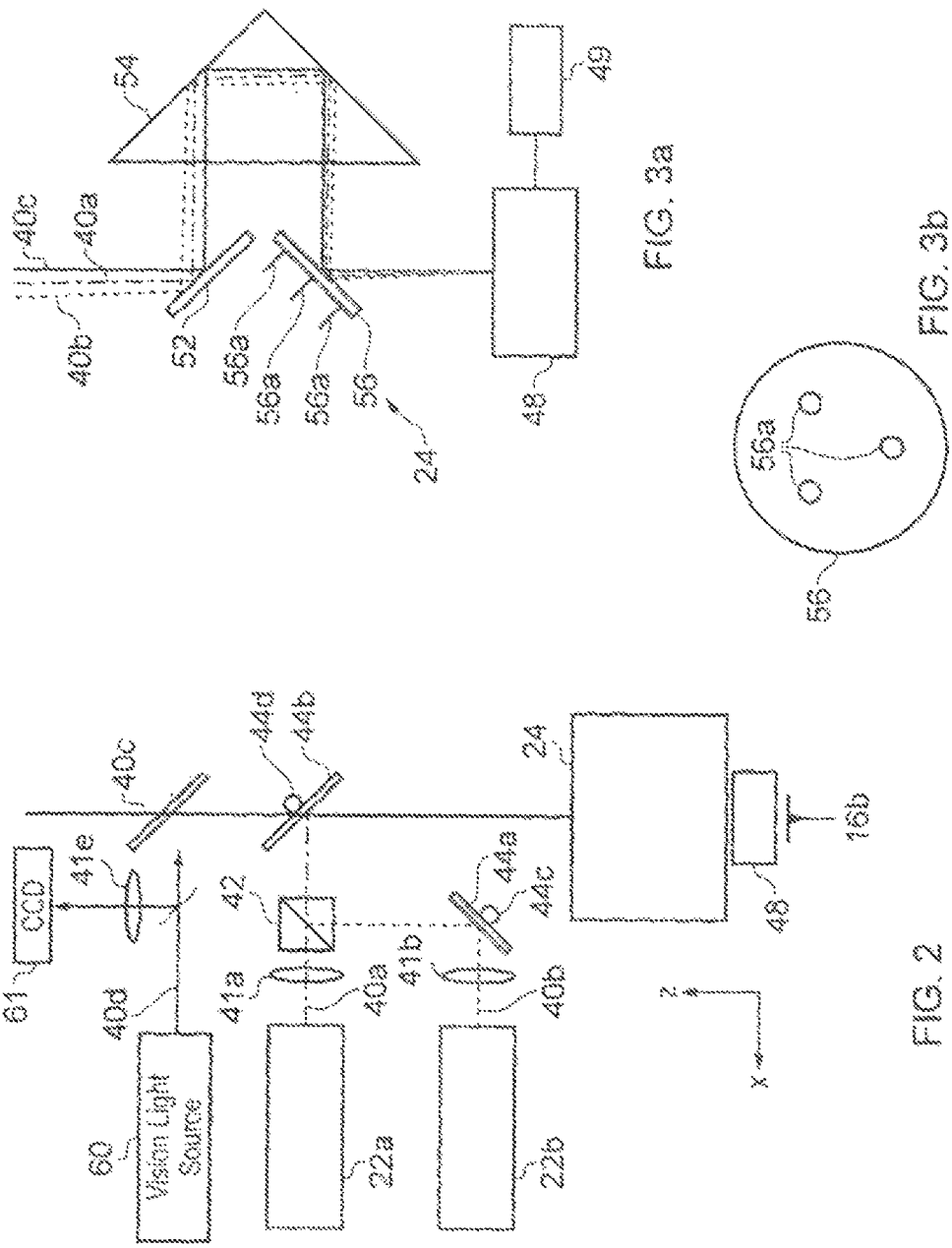

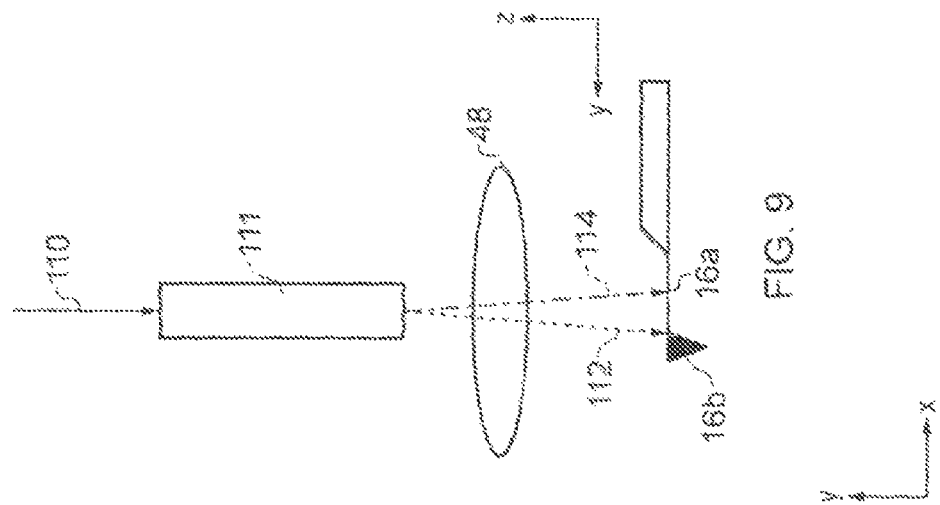
FIG. 9
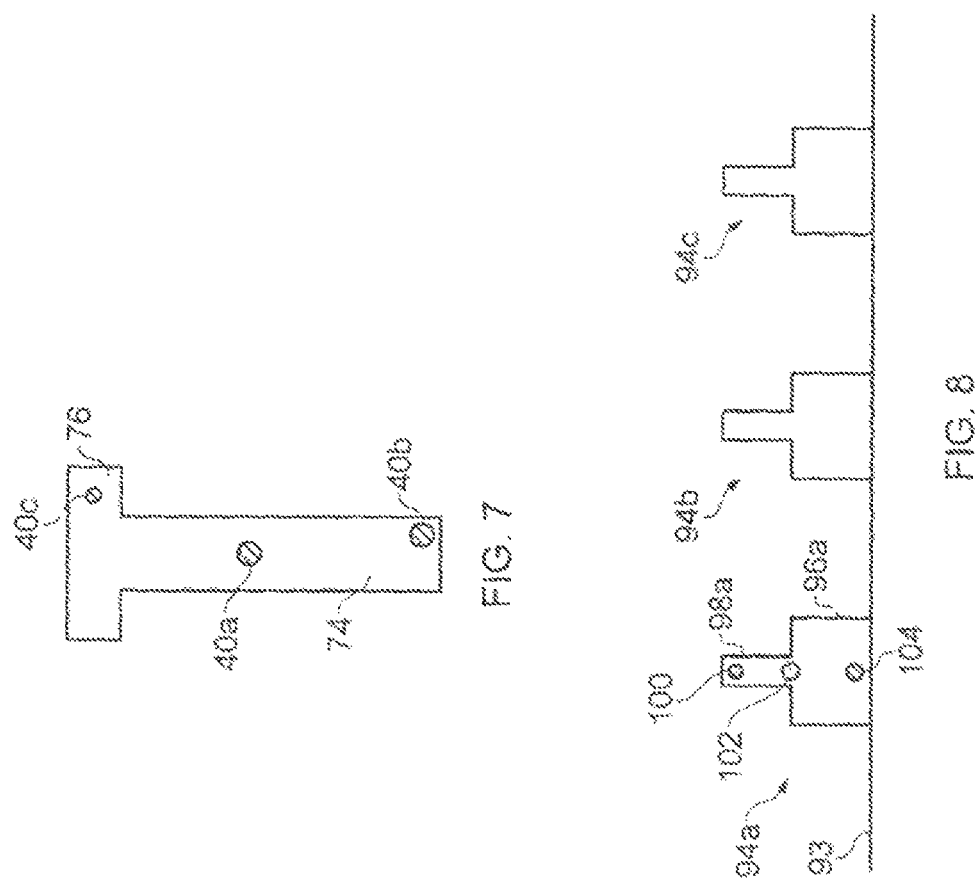
FIG. 7
FIG. 8

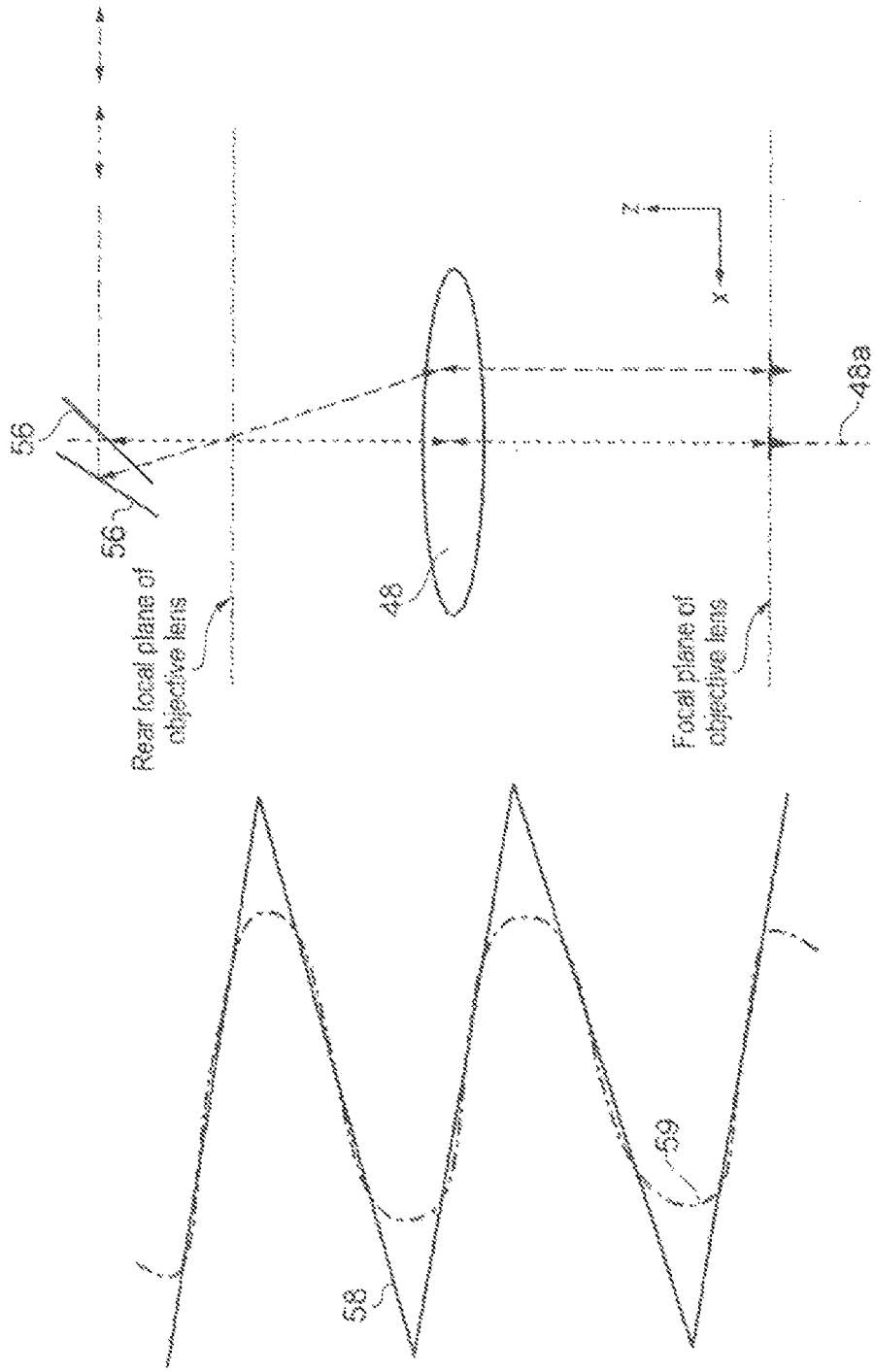

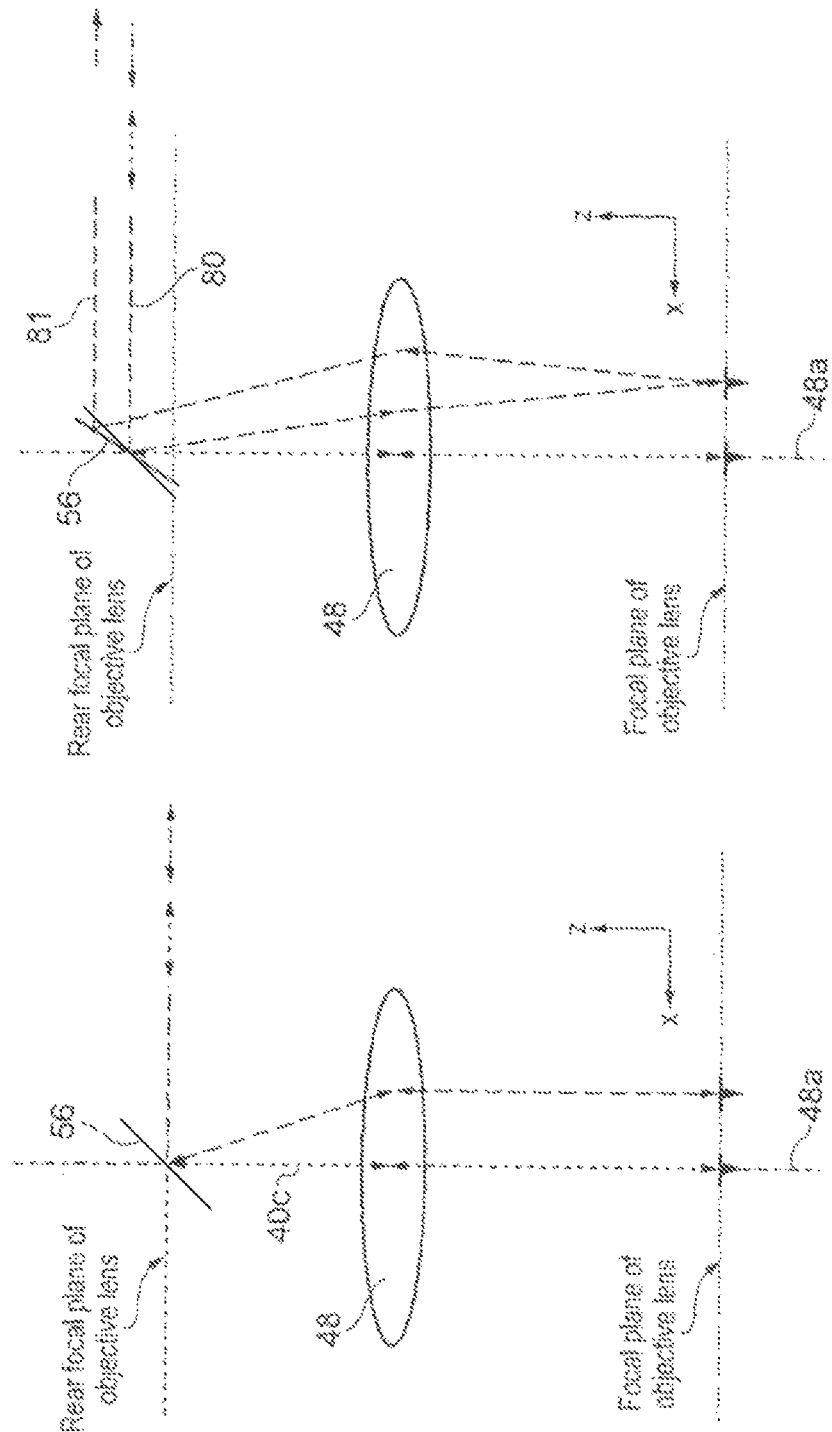

BEAM SCANNING SYSTEM

RELATED APPLICATIONS

The present application is a National Phase of International Application Number PCT/GB2013/050195 filed Jan. 29, 2013, and claims priority from Japanese Application Number 1201640.8, filed Jan. 31, 2012.

FIELD OF THE INVENTION

The present invention relates to a method of scanning a beam illuminating a probe microscope, and apparatus for use in such a method.

BACKGROUND OF THE INVENTION

US2009032706 (A1) describes a fast scanning probe microscope in which a detection beam is transmitted through scanning lenses and then reflected or scattered off the cantilever and received by a detector. A lens is translated by a scanner such that its motion is synchronous with that of the tip. In this way, the focused spot created by the lens tracks the moving cantilever. The use of a lens may cause problems due to chromatic aberration when illuminating the probe with light of different wavelengths. Also the lens may be heavy, making it difficult to move quickly and limit the speed of operation of the microscope.

SUMMARY OF THE INVENTION

A first aspect of the invention provides apparatus for illuminating a probe of a probe microscope, the apparatus comprising: a lens arranged to receive a radiation beam and direct it onto the probe; and a scanning system for varying over time the angle of incidence at which the beam enters the lens relative to its optical axis.

A second aspect of the invention provides a method of illuminating a probe of a probe microscope, the method comprising: generating a radiation beam; receiving the beam with a lens; directing the beam with the lens onto the probe; and varying over time the angle of incidence at which the beam enters the lens relative to its optical axis.

The first and second aspects of the invention provide an improved system and method in which the angle of incidence of the beam can be varied quickly and accurately. Variation of the angle may be employed in order to track motion of the probe, such motion typically having at least a component which is at right angle to the optical axis of the lens. This enables the beam to track a moving probe, and consequently enables a large sample to be scanned quickly. Alternatively the angle of incidence may be varied to sequentially direct a centre of the beam onto different locations on the probe, which may be stationary or in motion.

The beam may comprise an actuation beam which causes the probe to deform. The deformation of the probe caused by the beam may be a bending, twisting, or any other motion of the probe. In this case preferably the actuation beam causes the probe to heat and deform by the photothermal effect. The term "photothermal effect" is used herein to refer in general terms to the deformation of the probe caused by the heating of the probe, such heating of the probe being induced by its illumination. Alternatively the actuation beam may cause the probe to deform by some other mechanism such as by radiation pressure. Radiation pressure can be used in combination with highly reflective probe coatings and ideally some form of cavity, possibly a mirror attached to the probe.

The apparatus may comprise an actuation system for driving the probe (typically by deforming the probe), the actuation system further comprising a modulation system for modulating the intensity of the radiation beam. Similarly the method may further comprise a method of driving the probe, the method further comprising modulating the intensity of the radiation beam.

In addition to such an actuation system, the apparatus may further comprise a detection system for detecting movement of the probe. Preferably the detection system uses a detection beam which is focused onto the probe by the same lens which focuses the modulated actuation beam onto the probe. Preferably the scanning system moves the detection beam so as to track movement of the probe, thereby maintaining the location on the probe at which the detection beam is directed. In common with the modulated beam this may be achieved by varying over time the angle of incidence at which the detection beam enters the lens relative to its optical axis.

The scanning system may comprise a tracking system which moves the beam so as to track movement of the probe, such motion typically having at least a component which is at right angles to the optical axis of the lens, thereby maintaining the location (or locations) on the probe at which the beam is directed. In such a case the apparatus typically further comprises a probe driver operable by a scan controller to move the probe. Typically the movement of the probe caused by the probe driver is across a sample surface parallel to a plane of the sample. The tracking system is typically operable independently of the probe driver. The motion of the beam caused by the tracking system may be synchronized with the motion of the probe caused by the probe driver.

The scanning system may comprise a beam steering mirror which reflects the beam towards the lens; and a mirror actuator for rotating the beam steering mirror. Preferably the mirror actuator is arranged to rotate the beam steering mirror about an axis of rotation, and the axis of rotation lies in a rear focal plane of the lens. Preferably the beam steering mirror has a reflective surface which defines a plane of the mirror, and the mirror actuator is arranged to rotate the beam steering mirror about an axis of rotation which lies in the plane of the mirror. Optionally the mirror is translated as well as rotated. Alternatively the scanning system may comprise an electro-optical-modulator or an acousto-optical-modulator.

The apparatus may be provided as part of a probe microscope comprising a probe. The probe may comprise two or more materials with different thermal expansion coefficients which are arranged so that the (or each) beam heats the probe and causes the probe to deform by the photothermal effect.

The probe microscope may be used in a number of applications, including (but not limited to): material science and biological research, industrial inspection, semiconductor wafer and mask inspection and review; biosensing to detect multiple biomarkers; nanolithography, such as, dip pen nanolithography in which scanning probes deposit chemical compounds on a substrate; or data storage in which the probe has a heater allowing its temperature to be independently raised to melt a polymer substrate followed by an imprinting action by the probe producing a dent representing a binary digit.

Typically the probe microscope is operated to obtain information from a sample with the probe. The information obtained from the sample may be topographic information or any other kind of information (such as chemical and mechanical information about the sample or surface of the sample). The probe and microscope may be further adapted to measure other sample properties, such as magnetic or electric fields, via suitable interaction forces. Alternatively the scanning probe microscope may be operated to manipulate or modify a sample with the probe, for instance by removing or adding material such as to deposit chemical compounds on the sample or store data on the sample.

Typically the probe microscope is a scanning probe microscope. Scanning motion can be achieved by moving the probe and/or moving a sample with which the probe is interacting.

The microscope may comprise an image collection module for compiling an image of a sample scanned by the probe.

The beam may comprise a detection beam which reflects from the probe to produce a reflected detection beam, and the apparatus further comprises a detection system arranged to receive the reflected detection beam from the probe and detect movement of the probe from the reflected detection beam. In this case there may be no actuation beam, motion of the probe being achieved by some other means such as a piezoelectric driver. The variation of the angle of incidence of the detection beam into the lens may cause it to be sequentially directed onto different locations on the probe, for instance in order to detect different modes of probe motion from the reflected detection beam, or to detect a height or angle of the probe at two locations (for instance towards the base of a cantilever and towards the tip of the cantilever) and determine the height or angle difference between these two locations and hence the angle of deflection of the probe.

The beam may be collimated as it enters the lens. Alternatively the beam may be non-collimated (for instance divergent) as it enters the lens. In this case then the angle of incidence of the beam can be defined as its average angle of incidence (averaged across the width of the beam) and the method comprises varying over time this average angle of incidence at which the beam enters the lens relative to its optical axis.

A lens driver may be provided for translating the lens as it receives the radiation beam. The lens driver may translate to the lens to vary over time the position of its optical axis. This translation of the lens may be parallel to a plane of a sample being scanned by the probe (conventionally known as the XY plane)—for instance in order to track a probe which is moving parallel to the XY plane. Typically this translation of the lens is at right angles to the optical axis. Alternatively the translation of the lens may be towards or away from the sample (conventionally known as the Z direction and typically in a direction parallel to the optical axis of the lens)—for instance in order to adjust for changes in height of the sample during a scanning operation. The lens may be translated by the lens driver at the same time as the scanning system varies the angle of incidence of the beam, or at a different time.

Typically the probe is operated to obtain information from a sample scanned by the probe (scanning motion being achieved by moving the probe and/or moving the sample). Typically the scanning system is arranged to vary over time the angle of incidence at which the beam enters the lens relative to its optical axis as the probe is scanned and obtains the information from the sample.

BRIEF DESCRIPTION OF THE DRAWINGS

Embodiments of the invention will now be described with reference to the accompanying drawings, in which:

FIG. 2 illustrates the z actuation system of FIG. 1, showing details of a tracking system by which first, second and third laser beams are incident on localised regions of the probe, whilst the probe is scanned across a sample surface.

FIGS. 3a and 3b are enlarged views of the beam steering system illustrated in FIG. 2.

FIG. 7 shows the preferred positioning of three beams of the z actuation system on a different probe geometry.

FIG. 8 is a schematic illustration of an alternative thermal bimorph probe design showing preferred positioning of three actuation beams of the z actuation system.

FIG. 9 is a schematic illustration of an alternative z actuation system incorporating an AOM or EOM.

FIG. 11 shows a raster scanning motion of a probe.

FIG. 12 shows an arrangement in which the axis of rotation of the mirror is in the rear focal plane of the lens.

FIG. 13 shows an arrangement in which the axis of rotation of the mirror is not in the rear focal plane of the lens.

FIG. 14 shows an arrangement in which the mirror is translated as well as rotated.

DETAILED DESCRIPTION OF EMBODIMENT(S)

Figure 1:
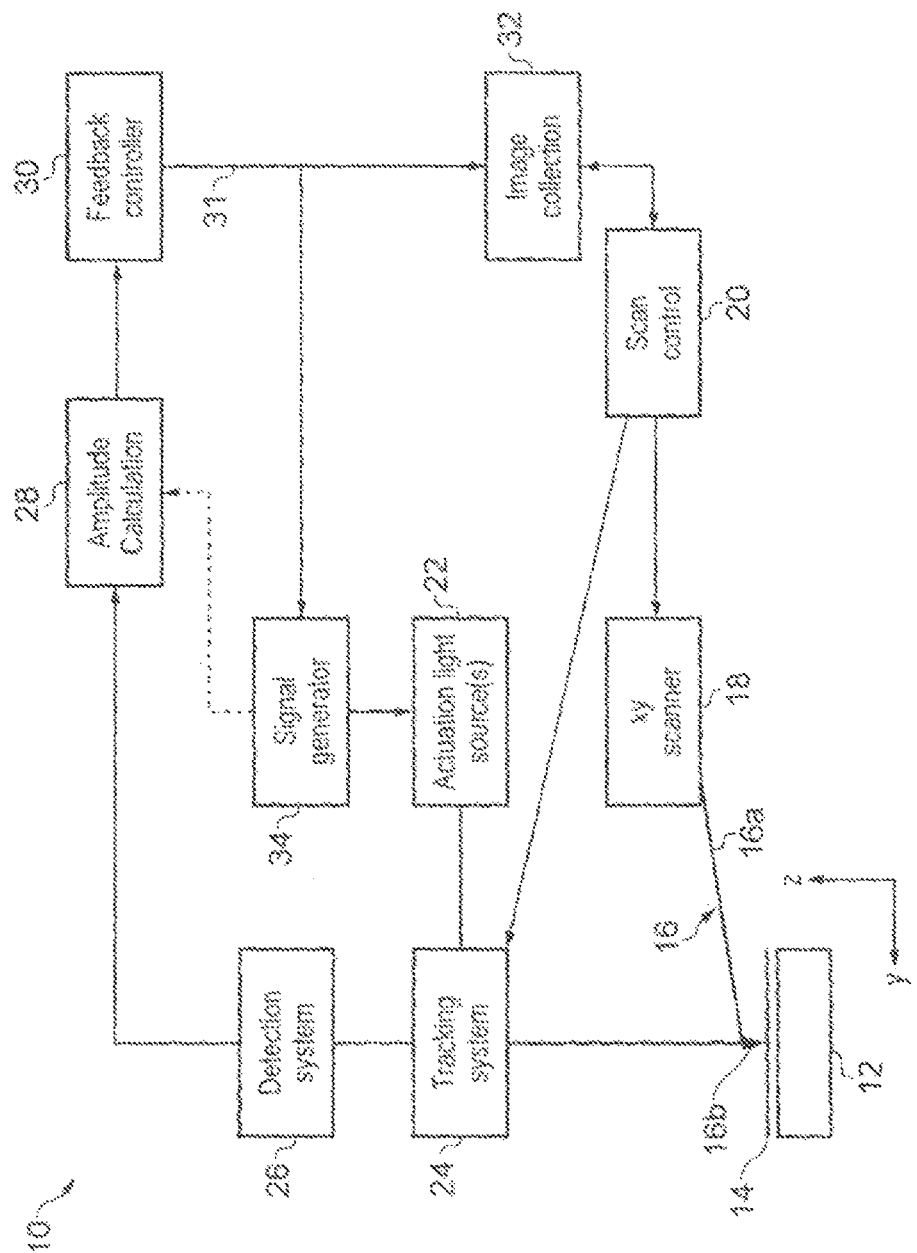
FIG. 1 is a schematic illustration of the components of an exemplary atomic force microscope that incorporates a z actuation system in accordance with an embodiment of the present invention.

With reference to FIG. 1, a novel microscope 10 that incorporates an embodiment of a z actuation system in accordance with the present invention is shown. The microscope 10 comprises a stage 12 on which a sample 14 to be investigated by a probe 16 is mounted. The probe 16 comprises a cantilever beam 16a and a tip 16b, which tapers to a fine point, and which is located towards a distal end of the cantilever beam. The other (proximal) end of the cantilever beam is fixed to a mount. The mount and probe 16 are connected to piezoelectric xy drivers 18 that are operable by a scan controller 20 to move the probe 16 across the sample surface in the plane (x,y) of the sample 14.

The cantilever 16a is of a type referred to as a thermal bimorph. That is, it is composed of two (or more) materials, with differing thermal expansions. Typically, this will be a silicon or silicon nitride base with a gold or aluminium coating. The coating extends the length of the cantilever 16a and covers the reverse side from the tip.

Actuation light sources 22 generate intensity-modulated radiation beams which are directed via a tracking system 24 onto the coated side of the cantilever. The wavelength of the light is selected for good absorption by the coating material. An optical system (not shown) directs the beams onto different locations on the cantilever 16a. The options for probe illumination and source arrangement will be discussed in more detail below. For the purposes of this overview, it suffices to understand that the bimorph probe 16 is illuminated in order to induce bending of the cantilever and so to adjust the z position of the tip.

A detection system 26 operates to collect a probe motion signal that is indicative of the deflection angle of the probe tip 16b. Within the detection system 26, a detection light source (not shown in FIG. 1) emits a light beam which is directed, via the tracking system 24, onto an upper surface (back) of the cantilever beam 16a at the end at which the tip is mounted. Light reflected from the back of the cantilever propagates to a deflection detector (not shown explicitly in this figure), typically a split photodiode, which generates an output that is representative of the deflection of the cantilever. Note that this light reflected from the back of the cantilever is not shown in FIG. 1, or FIG. 3a or 4, to simplify the drawings. The output of the detection system is analysed by a processor 28 to extract information relating to the amplitude of probe oscillation. The processor 28 may alternatively be operated to extract other parameters indicative of probe position, for example deflection or phase. A feedback controller 30, in response to the measured oscillation amplitude, outputs a feedback signal 31 that is used to instruct adjustment of probe position in order to maintain a constant oscillation amplitude on adjustment of the probe—sample separation. This adjustment of the probe position is referred to below as z-position feedback. An image collection processor 32 receives the feedback signal 31 from the feedback controller 30, which represents the information about the surface of the sample obtained by the microscope 10, and this, along with knowledge of the xy scan pattern, is used to construct a map of the sample 14. Typically the feedback signal and thus map provide height information about the surface of the sample.

As stated above, the cantilever 16a is a thermal bimorph structure, the materials of which undergo differential expansion when heated. In one embodiment, the cantilever 16a is fabricated from silicon nitride with an aluminium coating. The actuation light sources 22 emit light of one or more wavelengths at which there is a maximum or peak in the absorption spectrum for the particular coating. For example the wavelength may be around the aluminium absorption peak at ~810 nm. Other coating/wavelength combinations can be used, for example gold has a higher absorption below 500 nm light. When this light is incident on the coating side of the cantilever 16a, the aluminium expands to a greater degree than the silicon nitride, bending the cantilever such that the tip moves downwards, towards the sample. If illumination intensity is increased, the tip 16b therefore moves closer to the sample surface. Conversely, if the intensity is lowered, bending is decreased and the tip 16b is moved away from the sample.

Clearly other arrangements of coating and base materials may result in different levels of bending in the same or opposite direction in response to illumination. The actuation light sources 22 are controlled by a signal generator 34 that, in turn, is linked to the feedback controller 30. The signal generator 34 therefore is operable to control intensity of light emitted from the actuation light sources 22, which in turn determines the degree of bend exhibited by the thermal bimorph probe (regardless of its material specifics) and so governs the tip—sample separation distance during the course of a scan.

The intensity of light emitted from the actuation light sources 22 varies as the scan progresses in accordance with parameters that will be described later. Essentially, the actuation light sources 22 can be considered to provide the drive mechanism for two different types of probe control: the z position feedback described above and probe oscillation (described in more detail below). That is, it is set to drive oscillation of the probe and to adjust the probe—sample separation distance during the course of a scan.

In taking an image of the sample 14, the microscope is operated as follows. The signal generator 34 provides a source signal that oscillates at the desired frequency and amplitude. This signal, on input to the actuation light sources 22, causes one of the beams of light emitted by the sources to modulate its intensity in relationship to the waveform of the signal.

When this modulated light is incident on the cantilever 16a, it causes a flexing of the cantilever that varies with the intensity modulation. The probe tip 16b is therefore driven towards and away from the sample at a frequency and amplitude that, in free space, is the same as that of the drive signal. This drives the probe oscillation necessary for many atomic force microscope (AFM) applications. In a typical AFM operating in a dynamic mode the probe oscillation may be at or near resonance. Alternatively, the probe can be driven off-resonance, but still at a high frequency.

In operation, the probe 16 is irradiated by the modulated-intensity light beam, as described above, such that it oscillates with the desired free space amplitude. The signal generator 34 then, for example, increases its drive signal to one of the actuation light sources 22. This will be described in more detail below. In either case, the result is that the probe tip 16b is moved closer to the sample. The oscillation amplitude of the probe is reduced as the tip moves towards and interacts with the surface. Probe motion is monitored using the detection system 26. The output from the detection system 26 is passed to the processor 28, which extracts the amplitude of oscillation from the detector signal.

A feedback controller 30 calculates the difference between the observed amplitude of probe oscillation and that of the set point of the feedback controller 30. The controller 30 then generates a z feedback signal, which is used by the image collection processor 32 to construct the image of the sample surface. The z feedback signal is also input to the signal generator 34. The signal generator 34 then derives the instructional signal to be sent to one of the actuation light sources 22 to produce a remodulated output. The remodulated output results in a modulation of the bending pattern of the cantilever, effectively adjusting the z position of the tip in response to feedback as well as maintaining probe oscillation.

The xy scanner 18 drives the probe tip 16a across the surface of the sample, usually following a raster pattern. The scan controller 20 ensures that the tracking system 24 is matched with the scan pattern driven by the scanner 18 such that light from both the actuation sources 22 and the height detection system 26 maintain their position on the probe as it moves. The scan controller 20 may calculate different drive signals for the scanner 18 and tracking system 24 depending on their particular construction and mechanical behaviour. When the tip 16b encounters a part of the surface with, for example, increased height, its motion is changed and the monitored parameter, for example the amplitude of the probe oscillation, moves away from its set point. The feedback controller 30 is set to adjust the vertical position of the probe tip as controlled by one of the light sources 22 to move it away from the sample 14 and so to return the signal received from the detector 28 to its set point. The probe 16 is accordingly maintained in a position at which it has a constant average (over a number of oscillations) interaction with the surface.

With reference now to FIG. 2, the features of the z actuation system 22, 24, 34 are shown in more detail. In this example the actuation light sources 22 comprise first and second lasers 22a, 22b that each emit light at the same infrared wavelength, around 810 nm. Light 40a from the first laser 22a is horizontally polarised, whilst the light 40b from the second laser 22b is vertically polarised. The output intensity emitted by both lasers 22a, 22b is independently under the control of the signal generator 34 via respective drive signals.

A polarising beam combiner 42 is arranged such that polarised light 40a, 40b from the two light sources incident at respective faces are directed to exit at a single output face. Specifically, the beam combiner 42 has an internal mirror 42a arranged at 45° relative to the beam 40a which reflects the S polarisation component of beam 40b but transmits the P polarisation component of beam 40a.

The fact that the beam 40b is S polarised and the beam 40a is P polarised is not to be taken as restrictive. Either polarisation can be used for either beam, or indeed circular polarisations. All that is required is that they are differently polarised in order for them to be combinable in the beam combiner.

A first motorised mirror 44a is steerable by a mirror actuator 44c about two orthogonal axes of rotation to ensure that light 40b from the second laser 22b enters the beam combiner 42 at the required angle and position. Thus the first mirror 44a can be adjusted so that the laser output beams 40a, 40b exit the combiner either substantially parallel or with a small angular difference—this angular difference being more apparent in FIGS. 3 and 4. A third laser beam 40c, for use with the height detection system 26, is also directed by appropriate optics (not shown) to a steering mirror system 46 which is discussed in further detail below.

A second motorised mirror 44b is oriented to direct the combined z actuation beams 40a, 40b towards the tracking system 24. The angle of the second mirror 44b can be adjusted with respect to two orthogonal axes by a mirror actuator 44d so that the laser output beams 40a, 40b enter the tracking system 24 with a small angular difference relative to the beam 40c so that the three beams 40a, b, c enter the tracking system 24 with a small difference in angle between them. When the probe 16 is scanned across the sample surface by the xy scanning system 18, the tracking system 24 is similarly scanned to ensure that the three beams 40a, b, c follow the probe xy position and yet retain their relative displacement.

On exiting the tracking system 24, the beams 40a, b, c are simultaneously focused by an objective lens 48 towards the back of the cantilever 16a. As the beams 40a, 40b, 40c enter the lens system 48 at different angles they are focused on respective laterally displaced locations on the cantilever 16a.

Details of the tracking system 24 are shown in FIGS. 3a and 3b. The beams 40a, 40b, 40c are reflected from a fixed mirror 52 towards a right-angle block 54. The right angle block is oriented such that the beam 40c is incident normally on the entry face. The relative angular displacement of the beams 40a, 40b, 40c is maintained by the right angle block 54. The beams 40a, 40b, 40c then propagate to an adjustable mirror 56 oriented at an angle to the beam 40c. The beams 40a, 40b, 40c are reflected from the mirror 56 towards the objective lens 48. The mirror 56 is mounted on three piezoelectric actuator struts 56a which are separated by 120° round the centre of the mirror as shown in FIG. 3a. The lengths of the three struts 56a can be adjusted together to translate the mirror, or at different rates to rotate or tilt the mirror about two orthogonal axes. That is, the angle of the mirror 56 can be adjusted about the two orthogonal axes by tilting the mirror 56. The rotation about the two orthogonal axes can be controlled independently. As the mirror 56 tilts, the reflected beams 40a, 40b, 40c rotate together, with the result that the angle and point of incidence of each beam is moved laterally across the objective lens 48. Synchronisation of the mirror 56 tilt with the scanning pattern followed by the probe 16 as it is driven by the xy scanner 18 means that the three incident beams 40a, b, c, each retain their position on the probe. The positions of the beams 40a, b, c on the probe are determined only by the angles of incidence of the beams into the lens 48 (and not their points of incidence) so the spacing between the spots on the probe does not change as the points of incidence into the lens change.

It will be appreciated by one skilled in the art that this tracking system 24 can be adapted to allow four, five or more light beams to track a moving cantilever.

Figure 4:
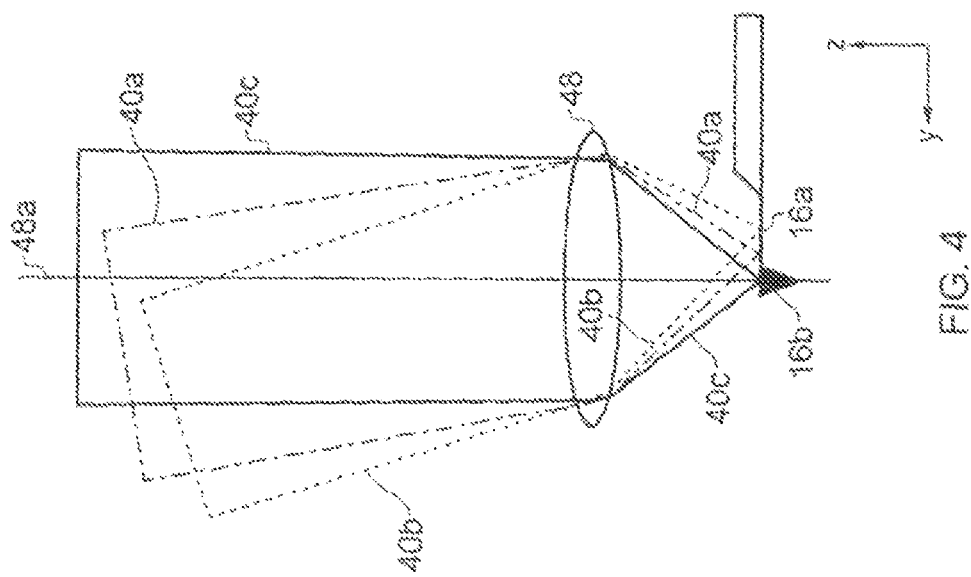
FIG. 4 is an enlarged view of the objective lens focusing three beams onto the cantilever.

FIG. 4 is a schematic view showing the objective lens 48 focusing the beams 40a-c into respective spots onto the cantilever 16a. Although the lens 48 is illustrated as a single lens element in FIG. 4, it will be understood that it may comprise an assembly of multiple lens elements. As discussed above the mirrors 44a, 44b are arranged such that the beams 40a-c enter the objective lens 48 at different angles of incidence relative to the optical axis 48a of the lens. As shown in FIG. 4, this results in the beams 40a-c being focused by the objective lens 48 onto the probe at different locations along its length. In this example the beam 40c is parallel with the optical axis 48a. Note that the beams 40a-c each have a diameter which is greater than a quarter of the diameter of the entrance pupil of the objective lens 48.

The optical system is an infinity optical system, so that the beams 40a-d are all collimated as they enter the objective lens 48 and the positions of the spots on the probe are only dependent on the angles of the collimated beams entering the objective lens 48 and not on their lateral positions. Optionally collimation lenses 41a,b may be provided to collimate the beams 40a,b if necessary. An infinity optical system is preferred because it enables the position of these lenses 41a,b to be adjusted and optical components added without affecting the formation of the spots on the cantilever. In an alternative embodiment (not shown) the optical system may be a finite optical system in which each beam is divergent as it enters the lens 48.

Figure 5:
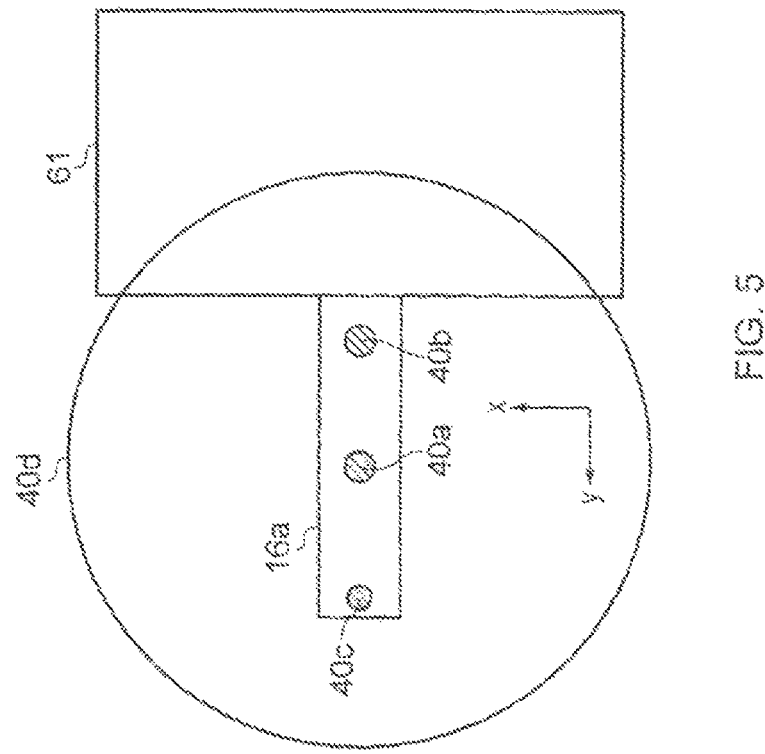
FIG. 5 shows schematically a cantilever, viewed from above, as it is illuminated by four separate light sources.

FIG. 5 shows schematically the spots on the cantilever 16a illuminated by the beams 40a-c. The centers of the spots are spaced apart, and the spots are non-overlapping. FIG. 5 also shows a large area illuminated by a beam 40d emitted by a vision system light source 60 shown in FIG. 2. This light source 60 is part of a vision system that enables optical alignment of the beams with the probe 16 prior to a scan being performed. Apart from the light source 60, the vision system also has a CCD camera 61, a partially reflective mirror, and a tube lens 41e to form the image on the CCD. The cantilever 16a is mounted on a substrate 61 and viewed from above (z direction).

The first spot, nearest the free distal end of the cantilever, is the incident position of the detection laser beam 40c. The detection laser beam 40c is an un-modulated beam which is used to detect the deflection of the back of the probe as the probe tip interacts with the sample surface. Accordingly, it should be positioned close to the tip 16b, on the reverse side of the cantilever. The tip 16b is, for most cantilever designs, towards the free distal end of the cantilever and so the detection laser beam 40c is similarly incident towards the free distal end.

The beam 40a is arranged to drive deflection of the probe (that is, it adjusts the probe—sample separation distance during the course of a scan in accordance with the z feedback signal 31) and illuminates the cantilever at a second spot located intermediate the free distal end and the proximal end/substrate 61. The beam 40b drives the oscillation of the probe during the course of a scan and is incident on the proximal end of the cantilever near to the interface of the cantilever 16a and the substrate 61. The spots formed by the beams 40a and 40b are shown as a similar size, but the illumination areas of the oscillation and deflection beams can be different.

The oscillation beam 40b and deflection beam 40a may be incident at different positions on the cantilever from those shown, although the locations illustrated are preferred. In particular, it has been found that oscillation of the cantilever is most efficiently excited by directing the oscillation beam 40b towards the base (proximal end) of the probe cantilever and near the substrate 61. This enables it to effectively drive the mechanical oscillation of the cantilever.

The large fourth spot is due to the illumination beam 40d for the camera 60 that is used to view the cantilever during set up. This can be optionally be turned off during a scan of a sample.

The tracking system 24 illustrated in FIG. 3 is arranged to track all four beams 40a-d together, maintaining their longitudinal alignment. In this way, they continue to illuminate the cantilever 16a, in the same relative orientation, as the probe is moved during the course of a scan.

Figure 6:
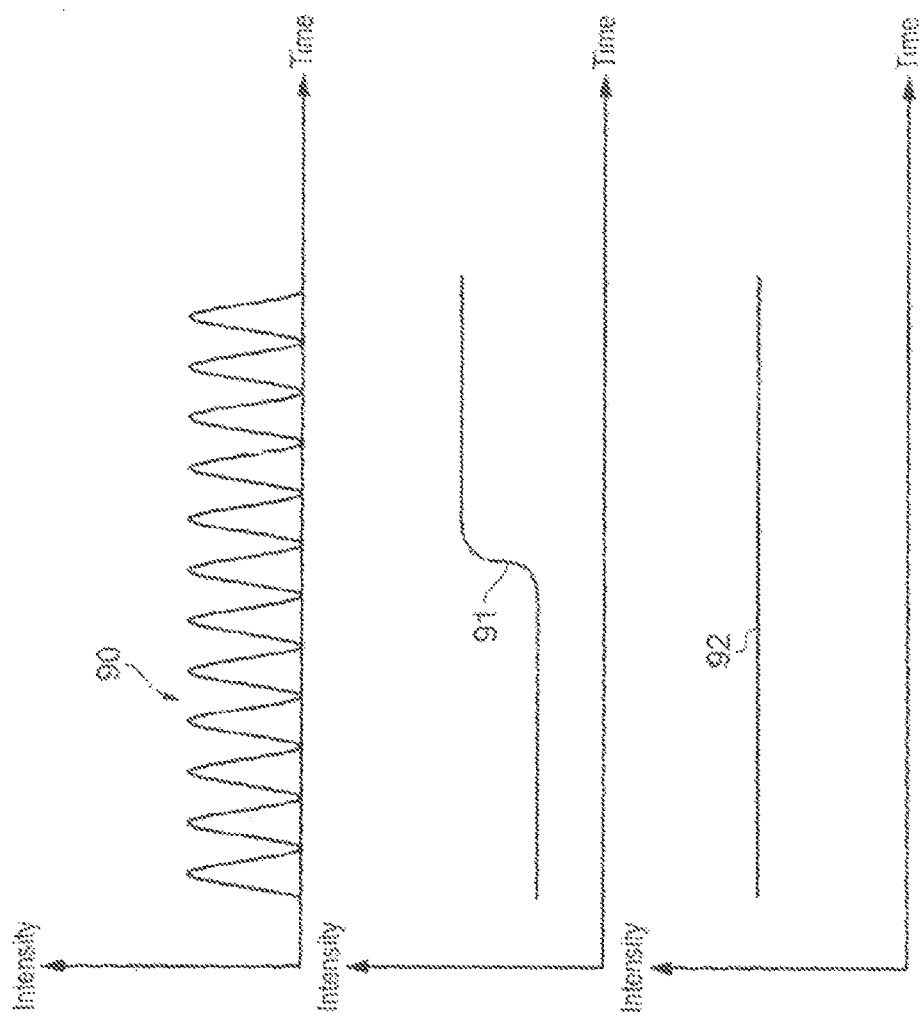
FIG. 6 shows the modulation intensity of the three actuation beams.

FIG. 6 is a graph showing the intensity modulation of the three beams 40a-c. The intensity of the oscillation beam 40b is modulated by the signal generator 34 in accordance with a first drive signal which is a sine wave 90 at a constant frequency, typically in the range of 10's of kHz to a few MHz, particular details depending on the microscope configuration, mode of operation and particular cantilever. The maximum amplitude of the oscillation of the probe tip 16b generated by the first drive signal is typically of the order of 10-200 nm. The intensity of the deflection beam 40a is modulated by the signal generator 34 in accordance with a second drive signal to maintain a constant oscillation amplitude of the probe so the tip 16b of the probe can track the profile of the sample, in this case changing the second drive signal at 91 as the tip 16b of the probe passes over a step in the sample. Typically the step has a size of the order of microns, so the amplitude of the deflection of the probe tip 16b caused by the second drive signal is typically an order of magnitude greater (that is, at least 10 times greater) than the amplitude of the deflection of the probe tip caused by the first drive signal. The detection laser beam 40c is un-modulated so has a constant intensity 92.

FIG. 7 shows an alternative probe geometry. In this arrangement, the cantilever is T-shaped with a longitudinal arm 74 extending from the base to the free end and a transverse cross bar 76 at the free end. Although not visible from this plan view, the tip is asymmetrically located on and supported by the cross bar 76. By torsional oscillation it is meant that the cantilever is oscillated about its longitudinal axis to effect a twisting motion. In this way, the offset tip describes a small arc that moves it vertically towards and away from the sample surface. Torsional oscillation of a T-shaped probe may therefore be used as an alternative to flexural oscillation of a standard rectangular probe.

Vertical tip motion established by torsional oscillation offers several advantages over other modes when used in high speed microscope scanning. The torsional resonance is at a higher frequency than the flexural resonance. Ideally, the torsional oscillation frequency is around 0.5-5 MHz and the flexural spring constant is of the order 0.2-2 Nm-1 (these parameters can be controlled by adjusting the dimensions of the cantilever). This means that the rate at which the surface is sampled is higher for torsional operation. This can therefore be used to increase scanning speed or to improve the sensitivity of the detection of the tip-sample interaction forces. Another problem encountered in dynamic imaging is that, on occasion, a large error in the feedback system (arising, for example, from a sudden change in surface height) may result in a large force being applied to the surface as flexural bending (deflection) increases to accommodate the error in the sample—probe base separation. Use of the torsional mode of oscillation to provide the dynamic oscillation means that the stiffness of the flexural bending can be reduced, without any loss of dynamic functionality. This lessens the effect of errors on applied surface force and provides a greater displacement of the probe if flexural bending is required in addition to the torsional mode.

As with the rectangular probe design of FIG. 5, three separate laser beams are focused on the back of the T-shaped probe in order to excite torsional oscillation. As before, the detection laser beam 40c is focused to a spot above the tip of the probe. As the probe tip is offset along the cross bar 76, so too is the detection spot 40c. The oscillation beam 40b is again focused at the proximal end of the cantilever 74 at the interface between probe and substrate in order to ensure efficient coupling. In this embodiment however, the spot 40b is offset to the right of the cantilever longitudinal axis. An offset position is found to best excite torsional oscillation. The third beam 40a is again focused centrally on the cantilever, intermediate the detection and oscillation beams.

FIG. 8 shows an alternative design of probe that is responsive to the z actuation system of this invention. In this embodiment, a substrate 93 supports an array of three probes 94a-c. Each probe has a wider region 96a at the substrate end and a narrower region 98a that extends to the free end. Both regions 96a and 98a are coated with a material of different thermal expansivity from the base material.

In this embodiment, a first illumination spot 100, above the position of the tip, is formed by the detection laser. This spot 100 does not drive probe movement. A second spot 102 is focused at the interface between the two sections 96a, 98a of the cantilever. This interface is again an effective coupling site for photothermal energy to excite mechanical oscillations. This spot 102 is accordingly from the laser that drives probe oscillation. A third spot 104 is focused on the section 96a of the probe, towards the substrate 92. This laser beam is responsible for probe selection. That is, it is focused on one of the probes 94a-c in order to lower it out of the plane of the other probes and so select that probe to carry out a scan. As before, the beam tracking system ensures that all beams maintain a fixed position relative to the probe as it is scanned across a sample. Deflection of the probe to follow the profile of the sample in the first embodiment is driven by a deflection beam 40a. In the case of FIG. 8 this profiling deflection can be driven by a fourth spot (not shown) between the spots 100 and 102; by the spot 104 (in addition to its probe selection function); or by another actuation mechanism such as a piezoelectric actuator.

FIG. 9 shows an alternative optical arrangement in which only a single modulated beam 110 is used instead of two modulated beams 40a,b as above. In this example the angle of incidence of the beam 110 into the lens 48 is switched between two angles 112, 114 by a modulator 111 so as to sequentially illuminate the probe with the beam 110 at two different locations on the probe. The modulator 111 is preferably an electro-optical-modulator or an acousto-optical-modulator. The modulator 111 is able to switch the angle sufficiently frequently that the probe does not cool down significantly between illuminations cycles at each angle. For instance the switching time between locations on the probe is preferably less than the thermal time constant of the locations on the probe. When the beam 110 is directed at the angle 112 then it is modulated to deflect the probe to follow the profile of the sample, and when it is directed at the angle 114 it is modulated to oscillate the probe.

In the example above the beam 110 is modulated synchronously with the location being addressed by the beam. That is, when the beam 110 is directed at the angle 112 a first modulation is applied to vary the intensity of the beam, and when the beam is directed at the angle 114 a second modulation is applied to vary the intensity of the beam. In an alternative example the intensity of the beam 110 may not be modulated, but instead the heating of the two locations can be modulated by controlling the amount of time that the beam spends at each location, in a similar manner to pulse-width modulation. That is, as the beam switches between the two locations the amount of time that it spends at each location can be varied over time, and thus the average power being transferred to each location will vary. In order to enable the two locations to be modulated independently, the beam may also be directed to a third location as part of the switching cycle, where that third location is either off the probe or part of the probe with no thermal response.

In a further alternative example the modulation of the beam 110 may not be varied synchronously with the location being addressed by the beam. In this example the beam 110 is continuously scanned over the surface of the cantilever for the purpose of distributing energy over a wide area rather than for the purpose of heating two locations differently. The intensity of the beam 110 is modulated as it scans over the surface (for instance for the purpose of oscillating the probe) but the intensity of the beam 110 is not modulated synchronously with the scanning motion. In other words it is not modulated at a first one of the locations in accordance with a first drive signal and at a second one of the locations in accordance with a second drive signal—rather it is modulated in accordance with a single drive signal only (for instance a sine wave of constant frequency) regardless of the angle of the beam.

For ease of illustration, in the embodiment of FIG. 9 the detection beam is not shown. However a detection beam will also be required, along with various other additional items shown in FIG. 2. The modulator 111 replaces items 42, 44a and 44c in FIG. 2. Thus the tracking system 24 is not replaced by the modulator 111, so the mirror 56 continues to be used to track the raster scanning motion of the probe.

As noted previously, probe motion in the z direction during a conventional AFM scan comprises two components: an oscillating component that is used to monitor probe—sample interaction and a z positioning component that is used to adjust probe—sample separation in response to a feedback signal in order to ensure that average interaction strength is maintained at a constant level. In the FIG. 1 embodiment of this invention, a single actuation system is used to drive all probe motion in the z direction. The feedback component of the drive signal is used to construct the image.

In the above-described embodiments the height detection system 26 was based on deflection detection using an optical lever (which measures the angle of the probe). Alternative height detection systems, for example those based on interferometry, may also be used. Such a detection system includes a light source that emits a laser beam, which is focused onto an upper surface of the tip end of the cantilever, and a reference beam, which is reflected from an upper surface of the stage. On reflection, these light beams propagate to a probe height detector, which includes an interferometer. The laser light is sufficiently coherent that an interference pattern is generated between the light reflected from the cantilever and the reference beam. This provides a measure of a path difference or change in the path difference between the two beams and hence an indication of the instantaneous height of the back of the cantilever above the stage surface.

The position of the spot 40c (directly above the probe tip in FIGS. 4, 6 and 7) is particularly preferred for the case where the detection system 16 is an interferometric detection system which directly measures the height of the tip of the probe. However if the detection system 16 is an optical lever (which measures the angle of the probe) then the position of the detection spot 40c is less critical, for example it can be placed anywhere across the cross bar 76 for the T-shaped probe as in the case of FIG. 6.

Figure 10:
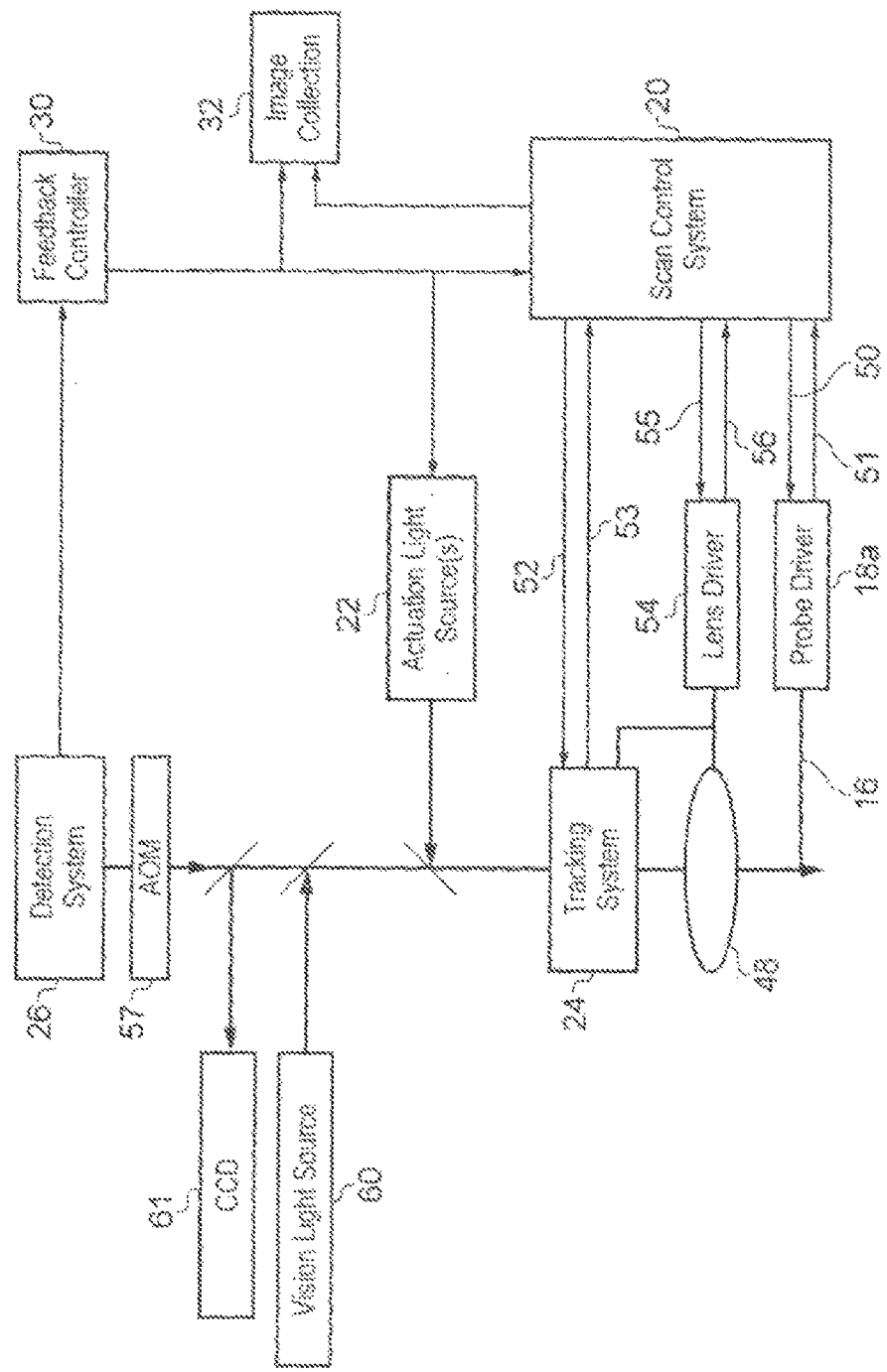
FIG. 10 shows a microscope in accordance with a further embodiment of the invention.

FIG. 10 shows a microscope with a number of features in common with the microscope of FIGS. 1-5, and the same reference numbers will be used to indicate equivalent components. The differences with the microscope of FIGS. 1-5 are as follows.

The piezoelectric XY scanner 18 of FIG. 1 is replaced by a piezoelectric probe driver 18a which can move the probe in the Z direction as well as the X and Y directions. The driver 18a is driven by a drive signal 50 and a sensor (not shown) such as an interferometer, capacitance sensor or LVDT sensor detects the position of the actuator 18a to provide a feedback signal 51 which the scan control system 20 can use to adjust the drive signal 50 in a feedback loop which ensures that the driver 18a drives the probe to a desired position. The mirror 56 in the tracking system 24 is arranged to move the beams so as to track XY movement of the probe caused by the probe driver 18a.

Similarly the tilting mirror 56 in the tracking system 24 is driven by a drive signal 52 and a sensor (not shown) such as an interferometer, capacitance sensor, strain gauge or LVDT sensor detects the position of the mirror 56 to provide a feedback signal 53 which the scan control 20 can use to adjust the drive signal 52 in a feedback loop which ensures that the mirror 56 is in a desired rotational position.

The microscope also has a piezoelectric lens driver 54 attached to the lens 48 which can move the lens 48 in the Z direction as well as the X and Y directions. The lens driver 54 is driven by a drive signal 55 and a sensor (not shown) such as an interferometer, capacitance sensor, strain gauge or LVDT sensor detects the position of the lens 48 to provide a feedback signal 56 which the scan control 20 can use to adjust the drive signal 55 in a feedback loop which ensures that the lens driver 54 moves the lens to a desired position. The lens driver 54 is arranged to translate the lens 48 so as to track movement of the probe caused by the probe driver 54 in X, Y and Z.

Also an acousto-optic modulator (AOM) 57 is provided to adjust an angle of the detection beam 40c from the detection system 26. The AOM 57 can be operated to switch the detection beam 40c between two or more points on the cantilever 16 in order to detect different modes of motion, or for any other reason—for instance to detect a height or angle of the probe at two locations (for instance towards the base of a cantilever and towards the tip of the cantilever). This switching may occur as the sample is scanned (for instance between raster lines or from pixel to pixel) or it may occur between two consecutive scans of the same sample.

In the embodiment of FIG. 3a, probe tip tracking is performed solely by the tilting mirror 56. This arrangement has a limited scan range due to the acceptance angle of the objective lens 48. For large scan ranges (well above 5 microns more typically greater than 10 microns, and most typically greater than 10s of microns) it is desirable to use other means of tip tracking. This can be achieved in the microscope of FIG. 10 by translating the objective lens 48 in the XY plane with the piezoelectric lens driver 54 (achieving a large scan range but at a slow scan rate) in combination with tilting the mirror 56 (achieving a fast scan rate but limited scan range). This nested approach could achieve far larger scan ranges, needed for certain types of inspection.

An example of this nested approach is shown in FIG. 11. The solid zig-zag line 58 illustrates a raster scanning motion of the probe in the XY plane. The dot-dash line 59 shows a sinusoidal low-frequency motion imparted to the radiation beam by motion of the lens 48. The rest of the XY motion of the radiation beam (in particular the high frequency motion where the raster scanning motion 59 abruptly changes direction at the end of each line) is imparted to the beam by rotation of the mirror 56.

The nested probe tracking method of FIG. 11 can be set up as follows. First the probe is moved, for example following a raster pattern scanned with a small range of motion, small enough to be tracked by the mirror 56 only. The mirror 56 is rotated with the lens 48 remaining stationary, and the position of the spot on the scanning probe is observed via the vision system 60,61. The mirror drive signal 52 is then adjusted so that the spot accurately tracks the moving probe without changing its position on the probe. Next the motion of the mirror 56 is stopped and the lens 48 is translated to track the motion of the probe in a similar way, the lens drive signal 55 being adjusted as the spot is observed via the vision system 60,61. Once the lens and mirror drive signals have been set up as described above, they can then be operated simultaneously to achieve the nested motion shown in FIG. 11.

Generally speaking the Z motion of the probe is less than the depth of focus of the lens 48, but for large scans there may be a large change in the height of the sample and during the scan the lens driver 54 can also be operated to translate the lens towards 48 or away from the sample (in the Z direction) so the probe remains in the focal plane.

FIGS. 12 and 13 are schematic diagrams showing the desirability of placing the axis of rotation of the adjustable mirror 56 at the focal point of the objective lens 48, as well as placing the axis of rotation of the adjustable mirror 56 in the plane of the mirror, where the mirror 56 is used to direct the detection beam 40c onto the probe. Note that in FIGS. 12-17 only the detection beam 40c is shown for the purpose of simplifying the drawings. However the probe may also be illuminated with actuation beams as shown in FIG. 1 via the same objective lens 48.

In both FIGS. 12 and 13 the probe is in the front focal plane of the lens 48. In the case of FIG. 12 the mirror 56 and its axis of rotation lies at a rear focal point of the lens 48 (that is, a point where the optical axis of the lens intersects with its rear focal plane), but in the case of FIG. 13 the mirror and its axis of rotation are offset from the rear focal plane.

In FIG. 12 it can be seen that if the detection beam is co-axial with the optical axis of the lens 48 and impinges on the probe at right angles then the reflected beam returns along the same path before and after reflection by the mirror 56. If the mirror 56 is rotated so that the detection beam 40c is no longer co-axial with the optical axis of the lens 48 then the beam which has been reflected by the probe and the mirror 56 does not shift. In this case the mirror 56 can be moved with a pure rotation (with no translation) in order to track the probe.

In FIG. 13 it can be seen that if the detection beam is co-axial with the optical axis of the lens 48 and impinges on the probe at right angles then the reflected beam returns along the same path before and after reflection by the mirror 56. The path of the reflected beam after reflection by the mirror 56 is labeled 80. If the mirror 56 is rotated so that the detection beam which illuminates the probe is no longer co-axial with the optical axis of the lens 48, then the beam which has been reflected by the probe and the mirror 56 shifts from position 80 to position 81. This shift is particularly undesirable if the shift or lateral position of the reflected beam is used to measure the angle of the reflected beam and thus angle of the probe, typically using a split photodiode detection system to determine the angle of the probe by measuring the lateral displacement of the reflected beam, for instance as described in WO2009/147450.

In some cases the construction of the objective lens 48 may make it impossible to place the axis of rotation of the adjustable mirror 56 in the rear focal plane of the objective lens 48. In this case the mirror 56 can be translated as well as rotated so that the reflected beam does not shift as shown in FIG. 13. An example is shown in FIG. 14 in which the mirror 56 is translated as well as being rotated, so the reflected beam follows the same path as the illumination beam after the reflected beam has been reflected by the mirror 56.

Figure 16:
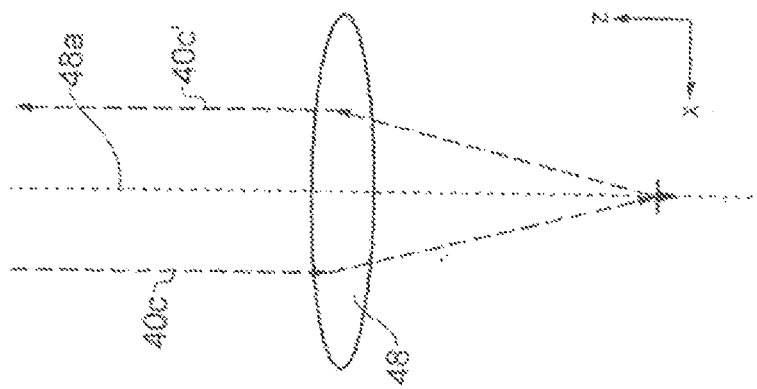
FIGS. 15-17 show a detection beam arrangement in which the detection beam is offset from the optical axis of the objective lens.
Figure 17:
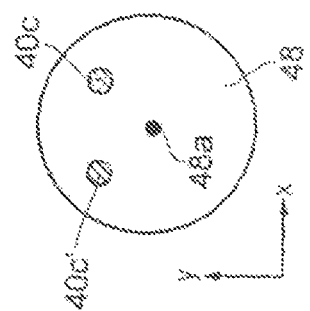
Figure 15:
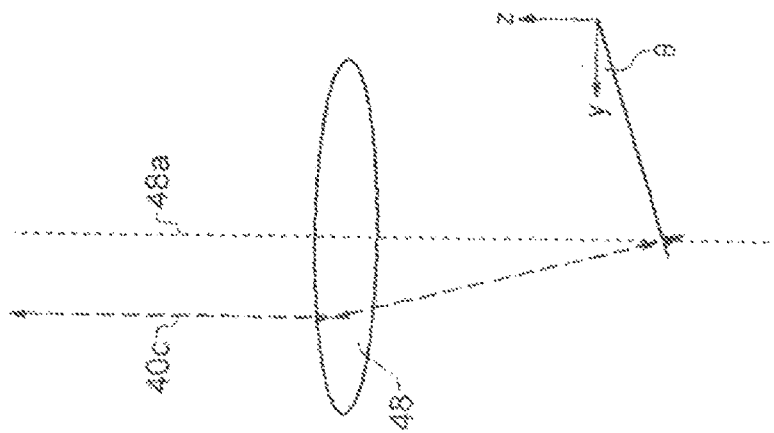

In FIG. 4 the cantilever 16 is shown lying horizontally (i.e. with its length extending in the Y direction). Also the centre of the detection beam 40c is shown in FIG. 4 to be co-axial with the optical axis 48a of the lens 48. However more typically the probe 16 extends downwardly at an acute angle θ to the Y axis as shown in FIG. 15, and the detection beam 40c is offset from the optical axis 48a in the Y and X directions as shown in FIGS. 15 and 16 respectively. FIG. 17 shows the lens 48 as viewed along the Z axis, showing the X and Y offset of the beams 40c,40c' from the optical axis 48a.

Offsetting the illumination beam 40c in the X direction from the optical axis 48a as shown in FIG. 16 ensures that the reflected beam 40c' does not return along the same path as the illumination beam 40c. This is desirable since it makes the reflected beam 40c' more easily directed towards a detector without needing to be optically separated from the illumination beam 40c.

Although the invention has been described above with reference to one or more preferred embodiments, it will be appreciated that various changes or modifications may be made without departing from the scope of the invention as defined in the appended claims.

The invention claimed is:

1. Apparatus for illuminating a probe of a probe microscope, the apparatus comprising:
   a lens arranged to receive a radiation beam and direct it onto the probe; and
   a scanning system for varying over time the angle of incidence at which the beam enters the lens relative to its optical axis, wherein
   the beam is a detection beam which reflects from the probe to produce a reflected detection beam, and
   the apparatus further comprises:
      a detection system arranged to receive the reflected detection beam from the probe and detect movement of the probe from the reflected detection beam, wherein the lens is also arranged to receive an actuation radiation beam and direct it onto the probe; and
      a modulation system for modulating the intensity of the actuation radiation beam.

2. The apparatus of claim 1 wherein the apparatus is an actuation system for driving the probe, and further comprises a modulation system for modulating the intensity of the radiation beam.

3. The apparatus of claim 1, wherein the scanning system comprises a beam steering mirror which reflects both the detection beam and the actuation radiation beam towards the lens.

4. The apparatus of claim 1 wherein the scanning system comprises an electro-optical-modulator or an acousto-optical-modulator.

5. The apparatus of claim 1 further comprising a lens driver for translating the lens.

6. The apparatus of claim 5 further comprising a probe driver operable to move the probe across a sample surface, wherein the tracking system is arranged to vary over time the angle of incidence at which the beam enters the lens relative to its optical axis so as to track movement of the probe caused by the driver, and wherein the lens driver is arranged to translate the lens so as to track movement of the probe caused by the probe driver.

7. The apparatus of claim 1 wherein the scanning system is arranged to vary over time the angle of incidence at which the beam enters the lens relative to its optical axis as the probe obtains information from a sample.

8. A scanning probe microscope comprising a probe; and apparatus according to claim 1.

9. The microscope of claim 8 wherein the probe comprises two materials with different thermal expansion coefficients which are arranged so that the beam heats the probe and causes the probe to deform by the photothermal effect.

10. A method of illuminating a probe of a probe microscope, the method comprising:
generating a radiation beam;
receiving the beam with a lens; directing the beam with the lens onto the probe; and
varying over time the angle of incidence at which the beam enters the lens relative to its optical axis, wherein
the beam is a detection beam which reflects from the probe to produce a reflected detection beam, and
the method further comprises:
receiving the reflected detection beam from the probe and detecting movement of the probe from the reflected detection beam;
receiving an actuation radiation beam at the lens and directing it onto the probe;
modulating the intensity of the actuation radiation beam; and
varying over time the angle of incidence at which the actuation radiation beam enters the lens relative to its optical axis.

11. The method of claim 10, wherein the method is a method of driving the probe, and the method further comprises modulating the intensity of the radiation beam.

12. The method of claim 10 wherein the beam heats the probe and causes the probe to deform by the photothermal effect.

13. The method of claim 10 wherein the probe is moved over the surface of a sample, and the intensity of the beam is modulated to follow a profile of the surface of the sample.

14. The method of claim 10 wherein the angle of incidence at which the beam enters the lens relative to its optical axis is varied to sequentially direct a centre of the beam onto different locations on the probe.

15. The method of claim 10 wherein the angle of incidence at which the beam enters the lens relative to its optical axis is varied to sequentially direct a centre of the beam onto different locations on the probe, and wherein the detection beam is sequentially directed onto the different locations on the probe in order to detect different modes of motion from the reflected detection beam.

16. The method of claim 10 further comprising obtaining information from a sample scanned by the probe, wherein the angle of incidence at which the beam enters the lens relative to its optical axis is varied as the probe obtains the information from the sample.

17. A method of illuminating a probe of a probe microscope, the method comprising:
generating a radiation beam;
receiving the beam with a lens; directing the beam with the lens onto the probe;
varying over time the angle of incidence at which the beam enters the lens relative to its optical axis;
receiving an actuation radiation beam at the lens and directing it onto the probe; and
modulating the intensity of the actuation radiation beam.

18. The method of claim 10 further comprising translating the lens.

* * * * *